United States Patent
Lee

(10) Patent No.: US 9,966,818 B2
(45) Date of Patent: May 8, 2018

(54) WATER-COOLED MOTOR

(71) Applicant: HYUNDAI MOBIS CO., LTD., Seoul (KR)

(72) Inventor: Sang Han Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 328 days.

(21) Appl. No.: 14/681,917

(22) Filed: Apr. 8, 2015

(65) Prior Publication Data

US 2015/0381014 A1    Dec. 31, 2015

(30) Foreign Application Priority Data

Jun. 25, 2014 (KR) .................. 10-2014-0077921

(51) Int. Cl.
| | |
|---|---|
| *H02K 9/19* | (2006.01) |
| *H02K 5/18* | (2006.01) |
| *H02K 5/20* | (2006.01) |
| *H02K 9/08* | (2006.01) |
| *H02K 9/22* | (2006.01) |

(52) U.S. Cl.
CPC ............... *H02K 9/19* (2013.01); *H02K 5/18* (2013.01); *H02K 5/20* (2013.01); *H02K 9/08* (2013.01); *H02K 9/22* (2013.01)

(58) Field of Classification Search
CPC .. H02K 9/19; H02K 5/18; H02K 5/20; H02K 9/08; H02K 9/22; H02K 1/20
USPC .................... 310/54, 57–59, 64, 89
See application file for complete search history.

(56) References Cited

U.S. PATENT DOCUMENTS

| | | | | |
|---|---|---|---|---|
| 4,549,103 A | * | 10/1985 | Shiga .................. | H02K 9/06 310/60 R |
| 5,789,833 A | * | 8/1998 | Kinoshita ............. | H02K 9/08 310/58 |
| 5,859,482 A | * | 1/1999 | Crowell ............... | H02K 5/20 310/54 |
| 6,232,690 B1 | * | 5/2001 | Schmider ............. | H02K 5/163 310/112 |
| 6,720,688 B1 | * | 4/2004 | Schiller ................ | H02K 9/08 310/59 |
| 7,525,224 B2 | * | 4/2009 | Takenaka ............. | H02K 5/20 310/52 |
| 8,395,288 B2 | * | 3/2013 | Huynh .................. | H02K 9/00 310/52 |

(Continued)

FOREIGN PATENT DOCUMENTS

| | | |
|---|---|---|
| CN | 201041974 Y | 3/2008 |
| CN | 102904385 A | 1/2013 |

(Continued)

*Primary Examiner* — Michael Andrews
(74) *Attorney, Agent, or Firm* — Knobbe Martens Olson & Bear LLP

(57) ABSTRACT

A water-cooled motor may include a motor housing configured to be provided with a cooling water passage part in a circumferential direction and have one side surface provided with a radiation fin part, a stator configured to have a core wound with a coil along the cooling water passage part within the motor housing, and a rotor configured to have plates which each face a side of the stator and the radiation fin part and have one side provided with a turbulence generator in a direction of the radiation fin part side.

7 Claims, 7 Drawing Sheets

(56) References Cited

U.S. PATENT DOCUMENTS

| | | | |
|---|---|---|---|
| 8,629,587 B2* | 1/2014 | Kao | H02K 5/20 |
| | | | 310/52 |
| 2004/0028539 A1* | 2/2004 | Williams | F04D 13/064 |
| | | | 417/366 |
| 2006/0028081 A1* | 2/2006 | Minagawa | H02K 1/2793 |
| | | | 310/156.36 |
| 2007/0063594 A1* | 3/2007 | Huynh | H02K 9/00 |
| | | | 310/59 |
| 2011/0169352 A1* | 7/2011 | Nagao | H02K 5/20 |
| | | | 310/59 |
| 2012/0217826 A1* | 8/2012 | Jiang | H02K 5/20 |
| | | | 310/54 |

FOREIGN PATENT DOCUMENTS

| | | |
|---|---|---|
| CN | 103683633 A | 3/2014 |
| KR | 10-2014-0064501 A | 5/2014 |

* cited by examiner

WATER-COOLED MOTOR

CROSS-REFERENCE(S) TO RELATED APPLICATION(S)

This application claims the benefit of priority to Korean Patent Application No. 10-2014-0077921 filed on Jun. 25, 2014, the entire contents of which are incorporated herein by reference.

BACKGROUND

Field

The present disclosure relates to a water-cooled motor.

Description of Related Art

Recently, in a vehicle using a combustion type engine, research and development for another type of vehicle, that is, a hybrid vehicle or an electric vehicle which is environmentally-friendly and excellent in fuel efficiency has been actively conducted.

The hybrid vehicle is driven with two power sources of the typical engine and a motor driven with electric energy and the electric vehicle is driven by only a motor driven with electric energy, and as a result, environmental pollution due to exhaust gas is reduced and fuel efficiency is improved. As a result, the hybrid vehicle and the electric vehicle have become as a next-generation vehicle which has recently received attention as a realistic alternative in U.S.A and Japan.

The hybrid vehicle or the electric vehicle is equipped with a high-capacity battery as a driving source for driving an electric motor to serve to supply power to a motor, if necessary, and charge electric energy generated from a renewable power source in the battery at the time of decelerating and stopping a vehicle.

The electric motor for a vehicle may be configured to largely include a rotor which is provided with a plurality of magnetic substances such as a permanent magnet and a stator which generates an electromagnetic force to rotate the rotor.

However, when the electric motor is driven for a long period of time, generally, high-temperature heat is generated around the rotor and the coil while the motor rotates at a high speed.

SUMMARY

An embodiment of the present invention is directed to a motor cooling structure capable of improving cooling efficiency of air in the motor by forming an air flow around the radiation fin part for cooling an inside of the motor in turbulence.

Other aspects and advantages of the present invention can be understood by the following description and become apparent with reference to the embodiments of the present invention. Also, it is obvious to those skilled in the art to which the present invention pertains that the aspects and advantages of the present invention can be realized by the means as claimed and combinations thereof.

In accordance with an embodiment of the present invention, a water-cooled motor may include: a motor housing configured to be provided with a cooling water passage part in a circumferential direction and having one side surface provided with a radiation fin part; a stator configured to have a core wound with a coil along the cooling water passage part within the motor housing; and a rotor configured to have plates which each face a side of the stator and the radiation fin part and have one side provided with a turbulence generator in a direction of the radiation fin part side.

The turbulence generator may form air around the radiation fin part in turbulence by a rotation of the rotor.

The turbulence generator may be formed as a plurality of wing parts which are integrally formed on the plate and are radially disposed based on the rotation shaft.

The wing part may be formed as any one of a radial fan type vertical to the rotating shaft, a multi-blade fan type inclined in a rotation direction, and a turbo fan type inclined in a direction opposite to the rotation direction.

The wing part may be formed as any one of a blade fan type having a blade shape and a limited load fan type having an 'S' shape.

The air in the motor housing may flow in the radiation fin part side by the rotation of the rotor.

A discharge nozzle communicating with the cooling water passage part may be formed on a surface of the motor housing.

The plate may be formed as a pair of plates which face each other at both outer sides of the stator.

The rotor may include a cylindrical holder which supports the pair of plates.

The water-cooled motor may include an inverter housing configured to be coupled with one side of the motor housing and provided with an inlet nozzle for introducing cooling water onto the surface.

The radiation fin part may be provided with a plurality of radial cooling fins.

In accordance with another embodiment of the present invention, a water-cooled motor, may include: a rotor configured to be provided with a permanent magnet and include first and second plates which are disposed in parallel with each other and a holder which couples the first and second plates with each other; a stator configured to include a core wound with a coil for generating an electromagnetic field to drive the rotor; a motor housing configured to have the rotor and the stator accommodated therein and have a radiation fin part, which is configured of a plurality of radiation fins, at one side adjacent to the first plate of the rotor; and a turbulence generator configured to have a base plate provided with a through hole to be coupled with a first plate which faces the radiation fin part and form turbulence around the radiation fin part which rotates together with the rotor.

The turbulence generator may include a plurality of wing parts which are radially formed around the base plate.

The wing part may be formed as any one of a radial fan type vertical to the rotating shaft, a multi-blade fan type inclined in a rotation direction, and a turbo fan type inclined in a direction opposite to the rotation direction.

The wing part may be formed as any one of a blade fan type having a blade shape and a limited load fan type having an 'S' shape.

The air in the housing may flow in the radiation fin part side by a rotation of the turbulence generation part.

DESCRIPTION OF EMBODIMENTS

Figure 1:
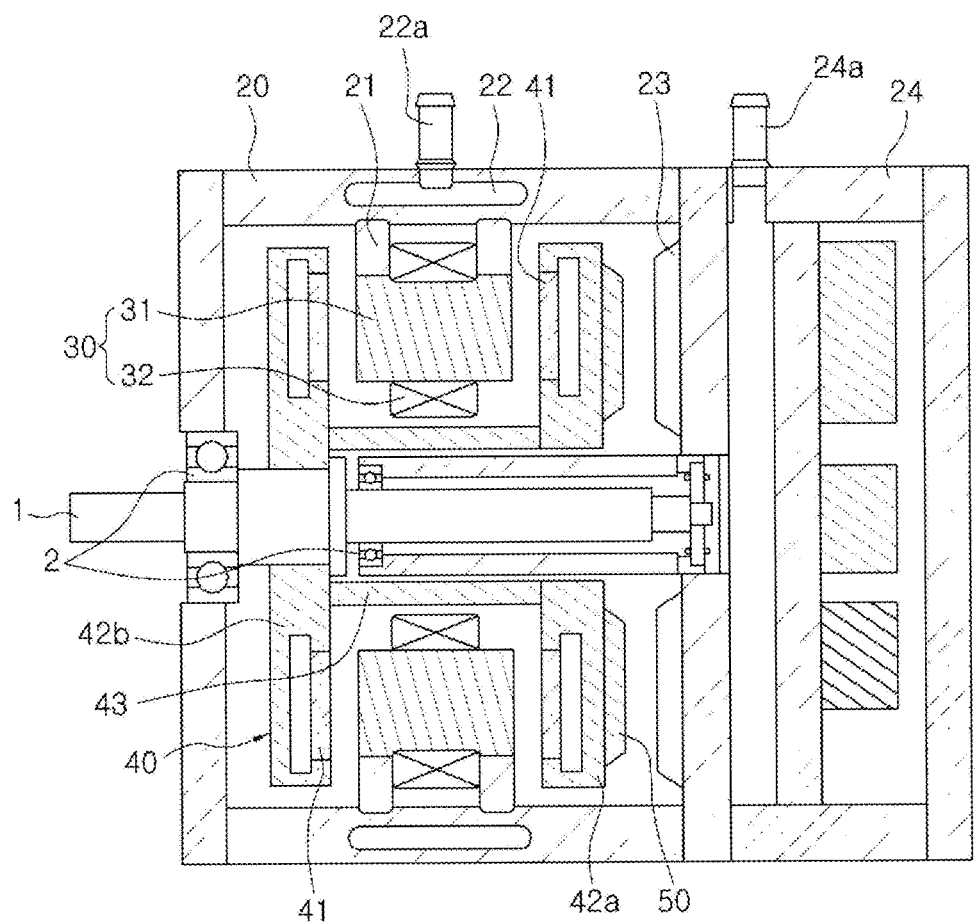
FIG. 1 is a cross-sectional view illustrating a structure of a water-cooled motor according to an embodiment of the present invention.

Hereinafter, a motor cooling structure according to embodiments of the present invention will be described in detail with reference to the accompanying drawings. Further, in describing embodiments of the present invention with reference to the accompanying drawings, the same or corresponding components are denoted by the same reference numerals and the overlapping description thereof will be omitted.

Figure 2:
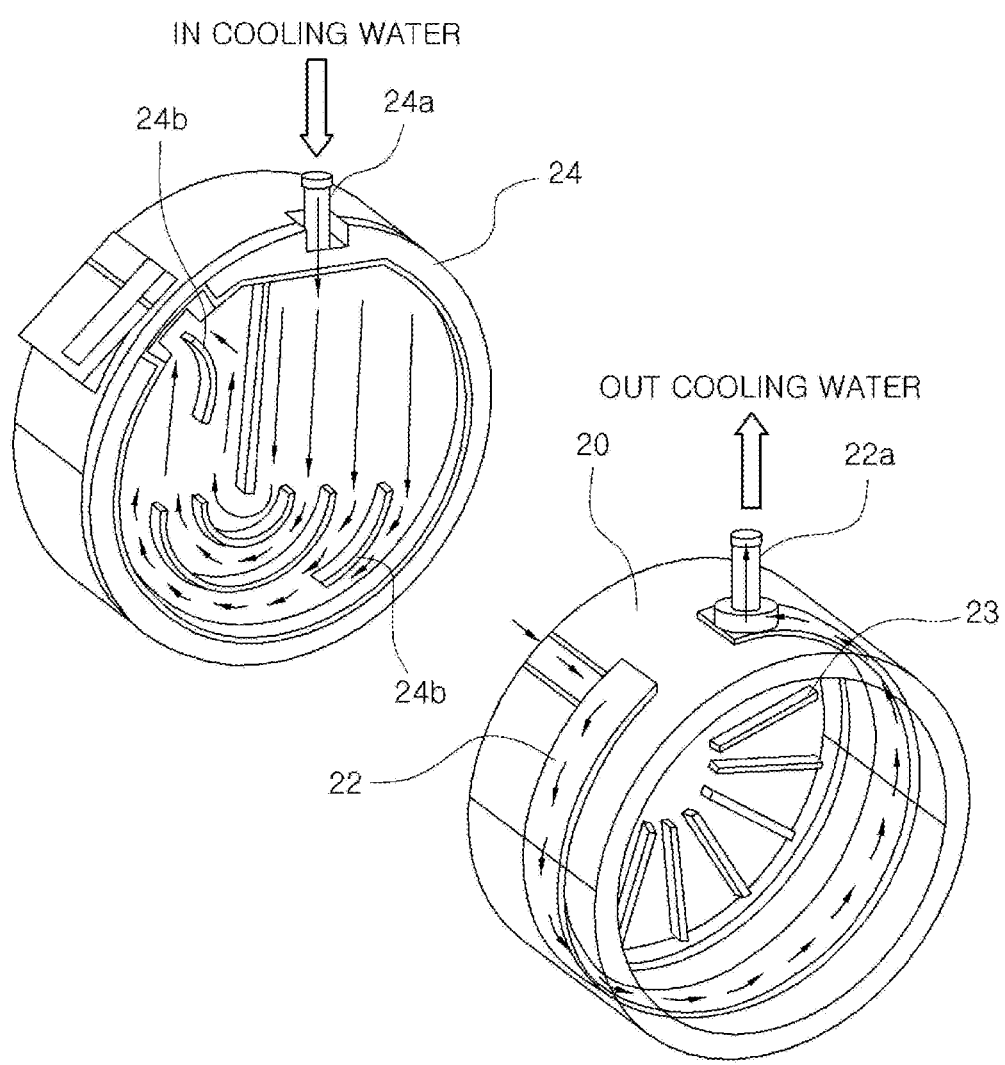
FIG. 2 is an exploded perspective view of a motor housing and an inverter housing of FIG. 1.
Figure 3A:
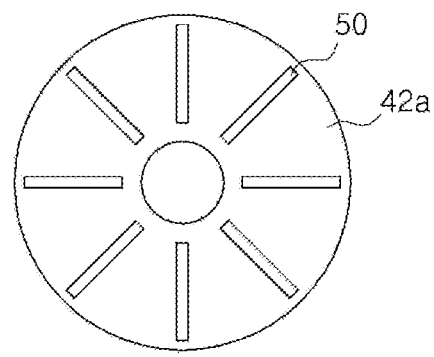
FIGS. 3A to 3E are exemplified views illustrating various examples of a structure of a turbulence generator of FIG. 1.
Figure 3B:
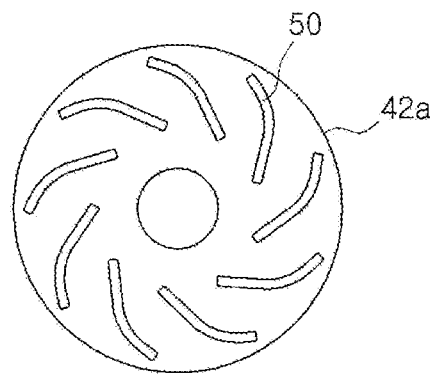
Figure 3C:
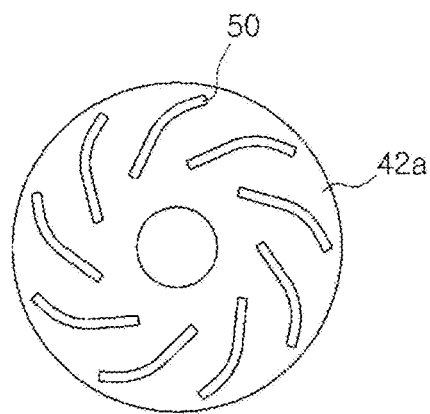
Figure 3D:
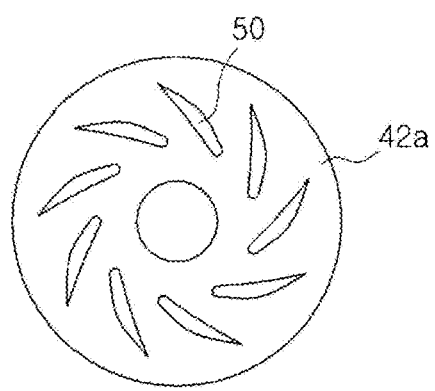
Figure 3E:
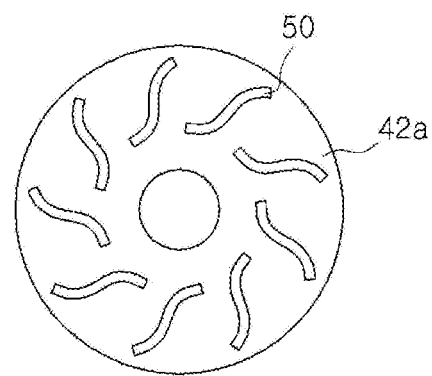
Figure 4:
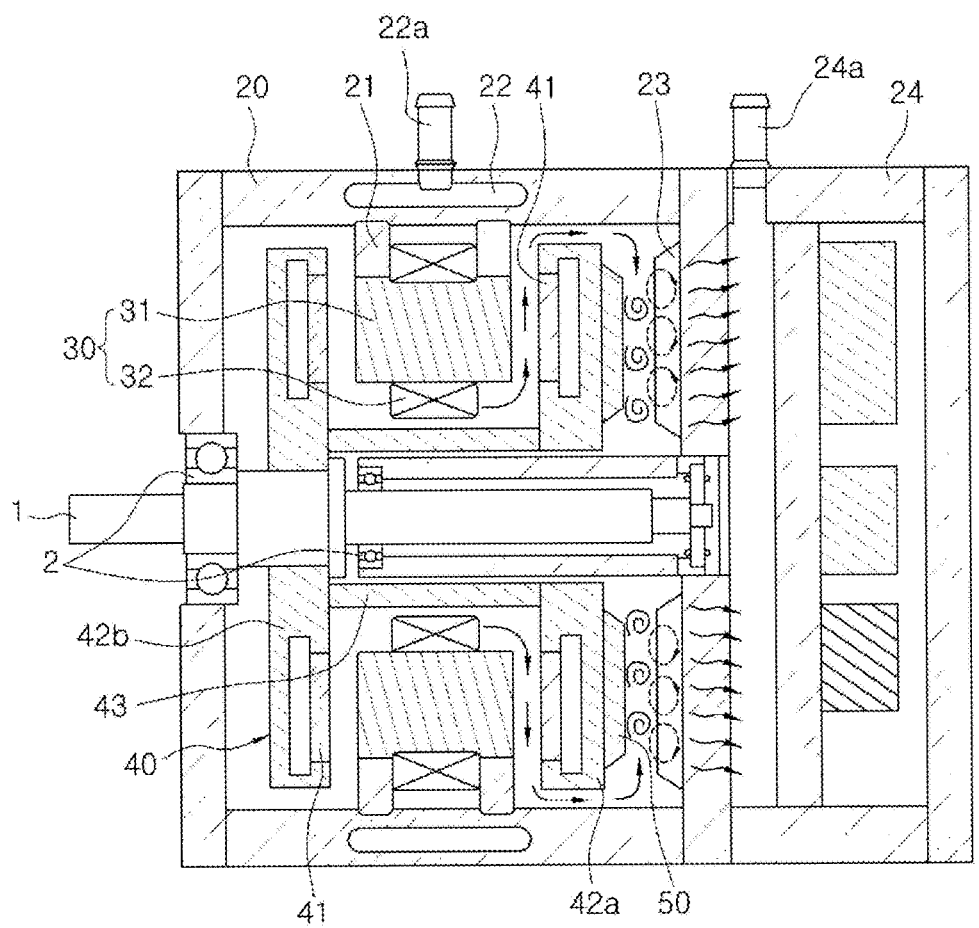
FIG. 4 is a cross-sectional view illustrating an air flow in a water-cooled motor according to an embodiment of the present invention.

FIG. 1 is a cross-sectional view illustrating a water-cooled motor 10 according to an embodiment of the present invention. FIG. 2 is an exploded perspective view of a motor housing 20 and an inverter housing 24 of FIG. 1. FIGS. 3A to 3E are exemplified views illustrating various examples of a structure of a turbulence generator of FIG. 1. FIG. 4 is a cross-sectional view illustrating an air flow in a water-cooled motor 10 according to an embodiment of the present invention.

Referring to FIGS. 1 and 2, the water-cooled motor 10 according to the embodiment of the present invention is to generate an electromagnetic field by power applied from the outside so as to generate a torque and may be configured to include a motor housing 20, a stator 30, and a rotor 40.

The motor housing 20 accommodates the stator 30 and the rotor 40 and includes a core holder part 21, a cooling water passage part 22, a radiation fin part 23, and an inverter housing 24.

The core holder part 21 is to couple the stator 30 to the motor housing 20 and may be made of a metal material having high heat conductivity to deliver high-temperature heat generated from a coil 32 of the stator to the motor housing 20. Further, the core holder part 21 according to the present embodiment may be configured of two hollow rings which are formed along an inner peripheral surface of the motor housing 20. In this case, the core holder part 21 is formed to adhere to a core 31, having the coil 32 disposed therebetween and is formed to adhere to the core 31 at a predetermined gap so as to prevent the coil 32 from being directly contacted with the motor housing 20, thereby supporting the stator 30.

The core holder part 21 directly delivers the high-temperature heat generated from the coil 32 to the motor housing 20 to prevent the motor housing 20 from being heated and indirectly delivers the high-temperature heat generated from the coil 32 to the motor housing 20 through the core 31 and the core holder part 21 so as to discharge the high-temperature heat to the outside, thereby discharging heat without the excessive increase in temperature of the motor housing.

The cooling water passage part 22 is formed along a circumferential direction of the motor housing 20 and is to exchange heat between cooling water supplied from the inverter housing 24 and the inside of the motor housing 20 and the cooling water passage part 22 may be formed along the core holder at which the coil 31 having a highest heating value is positioned. Further, the cooling water passage part 22 which is formed in the motor housing 20 is formed to extend along an outer circumference of the motor housing 20 to smoothly exchange heat between the cooling water and the motor housing 20 and the cooling water passage part 22 may discharge cooling water through a discharge nozzle 22a which is separately formed in the motor housing 20 and circulate the cooling water to a cooling water storage tank (not illustrated).

The radiation fin part 23 is formed within one side wall of the motor housing 20 to exchange heat between the inside of the motor housing 20 and the inverter housing 24 and the radiation fin part 23 according to the present embodiment may be formed in a plurality of linear radiation fin which radially extends around the rotating shaft 1.

The inverter housing 24 includes an inlet nozzle 24a into which cooling water is introduced. In this case, the cooling water introduced through the inlet nozzle 24a may flow in the whole portion facing the radiation fin part 23 through a guide protrusion 24b which guides the cooling water and then may be guided to the cooling water passage part 22 which is formed in the motor housing 20. In this case, the cooling water may be guided along the guide protrusion 24b to form an eddy at the portion facing the radiation fin part 23 and then may be guided to the cooling water passage part 22.

As described above, the stator 30 is configured of the core 31 around which the coil 32 is wound to generate an electromagnetic field and may be fixedly installed in the motor housing 20 by the core holder 21.

The rotor 40 is provided with at least one permanent magnet 41 which reacts to the electromagnetic field and may be configured of first and second plates 42a and 42b which are disposed in parallel to face each other and a cylindrical holder 43 which couples the first and second plates 42a and 42b with each other.

Further, the rotor 40 is connected to the rotating shaft 1 for delivering the torque to the outside. In detail, the rotating shaft 1 penetrates through the second plate 42b and both distal ends thereof may be rotatably supported by a bearing 2 which is formed in the motor housing 20.

Meanwhile, the first plate 42a which is adjacently positioned to the radiation fin part 23 of the rotor 40 may be provided with a turbulence generator 50 which protrudes from one side of the first plate facing the radiation fin part toward the radiation fin part.

The turbulence generator is formed at the first plate 42a adjacent to the radiation fin part 23 and thus rotates together with the rotation of the rotor 40 to make air around the radiation fin part 23 turbulence and takes a structure in which one side of the first plate is provided with a plurality of wing parts 50. The wing part 50 are radially formed in plural around the first plate 42a, that is, on the first plate 42a based on the rotating shaft 1 and may be formed as a radial fan type (FIG. 3A) which is vertical to the rotating shaft 1, a multi-blade fan type (FIG. 3B) in which the wing part is inclined in a rotation direction, and a turbo fan type (FIG. 3C) in which the wing part is inclined in a direction opposite to the rotation direction, depending on a direction in which the wing part 50 is inclined. Further, the wing part may be formed as a blade fan type (FIG. 3D) in which the wing part has a blade shape and a limited load fan type (FIG. 3E) in which the wing part has an 'S' shape, depending on the shape of the wing part.

The turbulence generator as described above rotates together with the rotation of the rotor 40 to move the air in the motor housing 20 to the radiation fin part 23. Here, the moving air in the motor housing forms the turbulence around the radiation fin part 23 to activate the air flow around the radiation fin part 23, thereby facilitating the heat exchange between the air in the motor housing 20 and the radiation fin part 23.

In addition, as the turbulence generator moves the air in the motor housing 20 to the radiation fin part 23, the air between the first and second plates 42a and 42b which is air in back of the first plate 42a may form the air flow which moves to the radiation fin part 23 by a suction effect. Therefore, the heat exchange with the air in the motor housing 20 by the radiation fin part 23 cools the air between the first plate 42a and the radiation fin part 23 and the air between the first and second plates 42a and 42b, thereby remarkably increasing the cooling efficiency inside the motor housing 20 by the radiation fin part 23.

Figure 5:
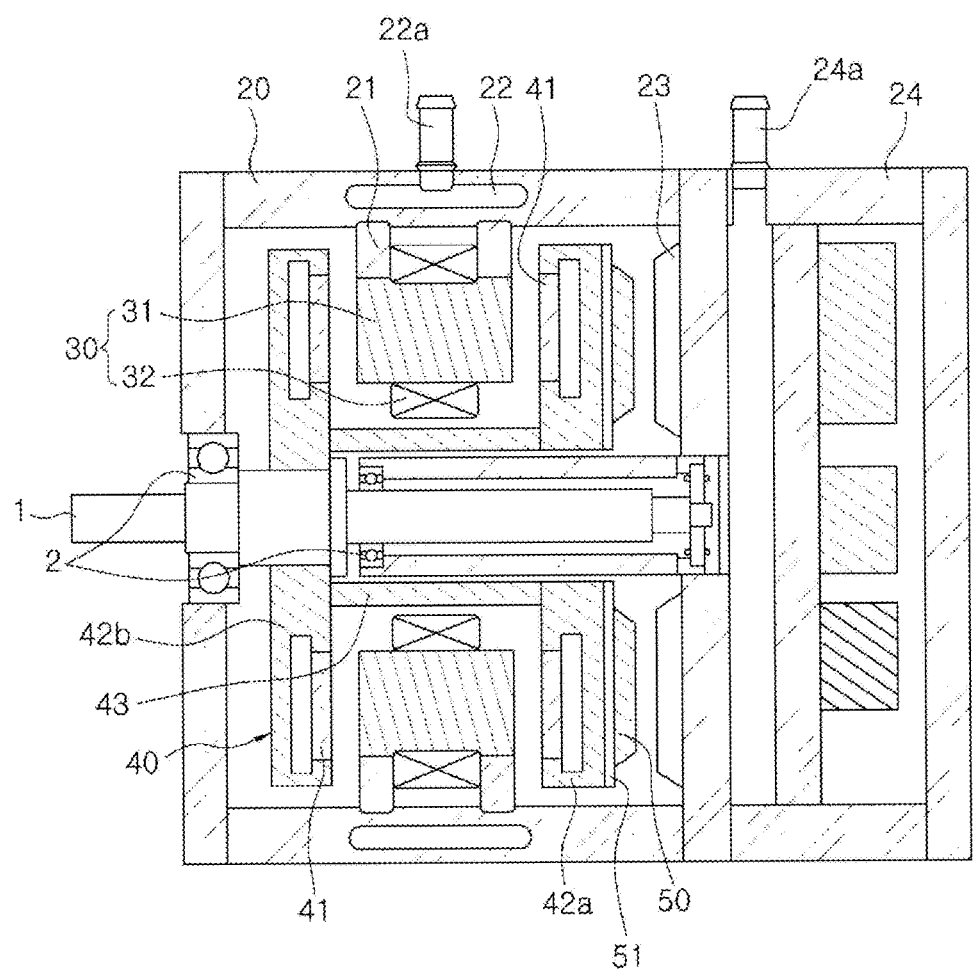
FIG. 5 is a cross-sectional view illustrating a structure of a water-cooled motor according to another embodiment of the present invention.

FIG. 5 is a cross-sectional view illustrating a structure of a water-cooled motor according to another embodiment of the present invention.

Meanwhile, unlike the turbulence generator protruding from the first plate 42a described above, the foregoing turbulence generator is formed in a separate configuration and thus may be formed on a side of the first plate 42a. That is, unlike the case in which the wing part 50 configuring the turbulence generator is directly formed on one side of the first plate 42a, the win part 50 may be separately fixed to one side of the first plate 42a by welding, a bolt, or other various methods. The turbulence generator may have a structure in which a base plate 51 provided with a through hole is formed and the base plate 51 is provided with the wing part 50. The so formed turbulence generator may be applied to the typical motor (or rotor) without the turbulence generator.

According to the embodiments of the present invention, it is possible to improve the cooling efficiency using the radiation fin part by actively exchanging heat between the air in the motor and the radiation fin part, by allowing the turbulence generator rotating together with the rotor to form the air flow around the radiation fin part in the turbulence.

Further, it is possible to effectively cool the inside of the motor by allowing the turbulence generator to move the air in the motor to the radiation fin part side.

Hereinabove, although the motor cooling structure according to the present invention is described with reference to with the embodiment of the present invention, the scope of the present invention is not limited to the foregoing embodiments, but it is apparent to those skilled in the art that the embodiment of the present invention may be variously corrected, changed, and modified without departing from the spirit of the present invention.

What is claimed is:

1. A water-cooled motor, comprising:
    a motor housing comprising a first sidewall, a second sidewall and a circumferential wall that define an inner space of the motor, the first sidewall opposing the second sidewall, the circumferential wall interconnecting the first and second sidewalls;
    a stator installed on an inner side of the circumferential wall and protruded into the inner space;
    a rotor configured to rotate about a rotational axis, the rotor comprising a first plate, a second plate, and a cylindrical holder, wherein the cylindrical holder interconnects the first and second plates with a gap therebetween such that the stator is interposed between the first and second plates in the gap;
    a cooling water passage integrated with the motor housing, the cooling water passage comprises a first passage section next to the first sidewall and a second passage section next to the inner side of the circumferential wall where the stator is installed,
    wherein the first plate comprises at least one fin protruding toward the first sidewall and overlapping the stator when viewed along the rotational axis such that, as the rotor rotates, the at least one fin is configured to generate air turbulence inside the inner space,
    wherein the first sidewall comprises an inner surface facing the at least one fin and an outer surface facing away from the inner surface, wherein the outer surface of the first sidewall is exposed to the first passage section such that cooling water in the first passage section contact the first sidewall.

2. The water-cooled motor of claim 1, further comprising a radiation fin protruding from the first sidewall toward the first plate.

3. The water-cooled motor of claim 1, wherein the first plate comprises two or more fins protruding toward the first sidewall.

4. The water-cooled motor of claim 1, wherein the at least one fin is formed as any one of a radial fan type vertical to a rotation shaft of the rotor, a multi-blade fan type inclined in a rotation direction, and a turbo fan type inclined in a direction opposite to the rotation direction.

5. The water-cooled motor of claim 1, wherein the at least one fin is formed as any one of a blade fan type having a blade shape and a limited load fan type having an 'S' shape.

6. The water-cooled motor of claim 1, further comprising a discharge nozzle in fluid communication with the second passage section of the cooling water passage on a surface of the motor housing.

7. The water-cooled motor of claim 1, comprising: an inverter housing next to the motor housing, the inverter housing comprising an inlet nozzle for introducing cooling water to first passage section of the cooling water passage.

* * * * *